United States Patent [19]

Sako

[11] Patent Number: 5,870,366
[45] Date of Patent: Feb. 9, 1999

[54] METHOD FOR RECORDING (SENDING) /REPRODUCING (RECEIVING) DATA, APPARATUS THEREOF, AND DATA RECORDING MEDIUM

[75] Inventor: Yoichiro Sako, Tokyo, Japan

[73] Assignee: Sony Corporation, Tokyo, Japan

[21] Appl. No.: 16,499

[22] Filed: Jan. 30, 1998

Related U.S. Application Data

[62] Division of Ser. No. 719,181, Sep. 24, 1996.

[30] Foreign Application Priority Data

Sep. 28, 1995 [JP] Japan .................. P07-274846

[51] Int. Cl.⁶ .................................................. G11B 7/00
[52] U.S. Cl. .......................... 369/59; 369/48; 369/58
[58] Field of Search ................. 369/59, 47, 48, 369/49, 50, 54, 58, 60, 32, 124; 360/48, 51

[56] References Cited

U.S. PATENT DOCUMENTS

| | | | |
|---|---|---|---|
| 5,060,221 | 10/1991 | Sako et al. | 369/59 |
| 5,216,656 | 6/1993 | Sako et al. | 369/59 |
| 5,343,452 | 8/1994 | Maeda et al. | 369/32 |
| 5,455,814 | 10/1995 | Sako | 369/59 |
| 5,469,416 | 11/1995 | Yamagami et al. | 369/48 |
| 5,694,381 | 12/1997 | Sako . | |
| 5,757,752 | 5/1998 | Sako . | |

FOREIGN PATENT DOCUMENTS

| | | |
|---|---|---|
| 0342833 A2 | 11/1989 | European Pat. Off. . |
| 0395125 A2 | 10/1990 | European Pat. Off. . |
| 0593214 A2 | 4/1994 | European Pat. Off. . |
| WO 95/24037 | 9/1995 | WIPO . |

*Primary Examiner*—Muhammad N. Edun
*Attorney, Agent, or Firm*—Limbach & Limbach L.L.P.

[57] ABSTRACT

A C2 encoder encodes data of 24 symbols supplied from a two-symbol delaying/scrambling circuit and generates a Q parity of four symbols. Data and Q parity are supplied to a interleaving circuit. The interleaving circuit adds delays that vary for a unit delay amount D each as in 0, D, 2D, ... , and so forth to individual symbols so as to interleave the data. In this case, since D=7, the maximum delay amount becomes 7×27=189. Thus, the total interleave length becomes 190. The total interleave length is slightly smaller than twice the unit of sub codes (98 frames). A C1 encoder encodes 28 symbols that have been interleaved and generates a P parity of four symbols.

4 Claims, 11 Drawing Sheets

METHOD FOR RECORDING (SENDING) /REPRODUCING (RECEIVING) DATA, APPARATUS THEREOF, AND DATA RECORDING MEDIUM

BACKGROUND OF THE INVENTION

This is a divisional of application Ser. No. 08/719,181, filed Sep. 24, 1996.

FIELD OF THE INVENTION

The present invention relates to a method for recording/reproducing (sending/receiving) data as a modification of a CD (compact disc) or the like, an apparatus thereof, and a data record medium thereof.

DESCRIPTION OF THE RELATED ART

Audio CDS (CD-DAs) that digitally and optically record audio signals are well known. A CD-DA has a diameter of for example 12 cm and a storage capacity of 600 MB or more. Thus, the CD-DAs can be used for external record mediums for computers as well as audio units.

CD-ROMs that record digital data other than audio data in an audio data record region of the CD-DA have been standardized. The CD-ROMs are read-only record mediums. For the CD-ROMs, the same recording/reproducing processes as those of the CD-DAs are performed. In other words, digital data that has been error-correction-code encoded by the CIRC (Cross Interleave Reed-Solomon Code) encoding process as a folding type dual code encoding process and that has been modulated by the EFM (Eight to Fourteen Modulation) method is recorded on the CD-ROMs.

In the folding type dual code encoding process, 24 symbols (bytes) of 12 words are encoded with the Reed-Solomon code (C2 code) and thereby a parity of four symbols (Q parity) is generated. An interleaving process is performed for the data of 28 symbols and the Q parity. The resultant data is encoded with the Reed-Solomon code (C1 code) and thereby a parity of four symbols (P parity) is generated. A total of 32 symbols that are data of 24 symbols, Q parity of four symbols, P parity of four symbols, and a sub code of one symbol are sent as one frame.

A sub code is composed of eight channels P to W. One symbol (one byte) composed of eight bit of the channels is placed in each frame. One unit is composed of sub codes for 98 frames. For example, the channels P and Q of each sub code are used for detecting the top position of a program. The other channels are used to record a still picture and character data. The access unit of the CD-ROM is 2,352 bytes (=24 bytes×98) that are data contained in 98 frames that are the unit of sub codes. This access unit is also referred to as a block. However, in the following description, the access unit is referred to as a sector.

In the interleaving process of the CD-DA, 28 symbols are delayed with an amount that varies by a unit delay amount one after the other such as 0, D, 2D, . . . , and 27D (where D is the unit delay amount, D=four frames). Thus, the maximum delay amount is (4×27=108 frames). A frame is a block of data of 28 symbols that are encoded with the C1 code. Now, the total frame length between the symbol with the delay amount of 0 and the symbol with the maximum delay amount (27D) is referred to as the total interleave length (thus, 4×27+1=109 frames). Consequently, to correct an error, data of 109 frames should be read.

The total interleave length defines the correction performance against a burst error of which errors sequentially take place in data due to a finger print on the disc, a scratch thereon, and so forth. The strength of the correction performance against the burst error is proportional to the total interleave length. Unlike with audio data, computer data cannot be interpolated. Thus, when computer data is used, the total interleave length is preferably increased.

In addition, as in the above-described CD-ROMs, it is defined that one sector is composed of 98 frames. Thus, the size of one sector does not accord with the total interleave length. On the other hand, data is recorded and reproduced, sector by sector. Consequently, to rewrite or read data of one sector, data of adjacent sectors should be also read. Thus, data is wastefully accessed.

OBJECTS AND SUMMARY OF THE INVENTION

Therefore, an object of the present invention is to provide a method for recording/reproducing (sending/receiving) data of which the relation between the length of the unit of sub codes and the total interleave length is defined so as to improve the correction performance against a burst error and thereby preventing data from being wastefully accessed.

The invention of claim 1 is a data recording apparatus for recording a predetermined number of frames on a record medium at a time, one frame being composed of information data and a sub-code corresponding to the information data, additional information corresponding to a predetermined number of frames being composed of a predetermined number of sub-codes, the data recording apparatus comprising: interleaving means for interleaving each of the frames with an interleave length that is a multiple of the predetermined number and forming interleaved frames; encoding means for encoding the interleaved frames with an error encoding code and for forming encoded interleaved digital data; and recording means for recording the encoded interleaved frames on the record medium.

The invention of claim 2 is a data reproducing apparatus for reproducing data from a record medium on which a predetermined number of encoded interleaved frames have been recorded, the encoded interleaved frames being generated by interleaving and encoding frames, one frame being composed of information data and a sub-code corresponding to the information data, additional information corresponding to a predetermined number of frames being composed of a predetermined number of sub-codes, the data recording apparatus comprising: reproducing means for reproducing the encoded interleaved frames from the record medium and outputting the encoded interleaved frames; decoding means for decoding the encoded interleaved frames so as to form interleaved frames; and deinterleaving means for deinterleaving the interleaved frames with an interleave length that is a multiple of the predetermined number and for forming frames.

The invention is claim 3 is a data recording method for recording a predetermined number of frames on a record medium at a time, one frame being composed of information data and a sub-code corresponding to the information data, additional information corresponding to a predetermined number of frames being composed of a predetermined number of sub-codes, the data recording method comprising the steps of: interleaving each of the frames with an interleave length that is a multiple of the predetermined number and forming interleaved frames; encoding the interleaved frames with an error encoding code and for forming encoded interleaved digital data; and recording the encoded interleaved frames on the record medium.

The invention is claim 4 is a data reproducing method for reproducing data from a record medium on which a predetermined number of encoded interleaved frames have been recorded, the encoded interleaved frames being generated by interleaving and encoding frames, one frame being composed of information data and a sub-code corresponding to the information data, additional information corresponding to a predetermined number of frames being composed of a predetermined number of sub-codes, the data reproducing method comprising the steps of: reproducing the encoded interleaved frames from the record medium and outputting the encoded interleaved frames; decoding the encoded interleaved frames so as to form interleaved frames; and deinterleaving the interleaved frames with an interleave length that is a multiple of the predetermined number and for forming frames.

The invention of claim 16 is a record medium for recording two or more units of a predetermined number of frames on a record medium at a time, one frame being composed of information data and a sub-code corresponding to the information data, additional information corresponding to a predetermined number of frames being composed of a predetermined number of sub-codes, each of the frames with an interleave length that is equal to or smaller than a multiple of the predetermined number being interleaved so as to form interleaved frames, the interleaved frames being encoded with an error encoding code so as to form first encoded interleaved digital data, the first encoded interleaved frames being recorded on the record medium, each of the frames with an interleave length that is larger than a multiple of the predetermined number being interleaved so as to form interleaved frames, the interleaved frames being encoded with an error encoding code so as to form second encoded interleaved digital data, the second encoded interleaved frames being recorded on the record medium.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
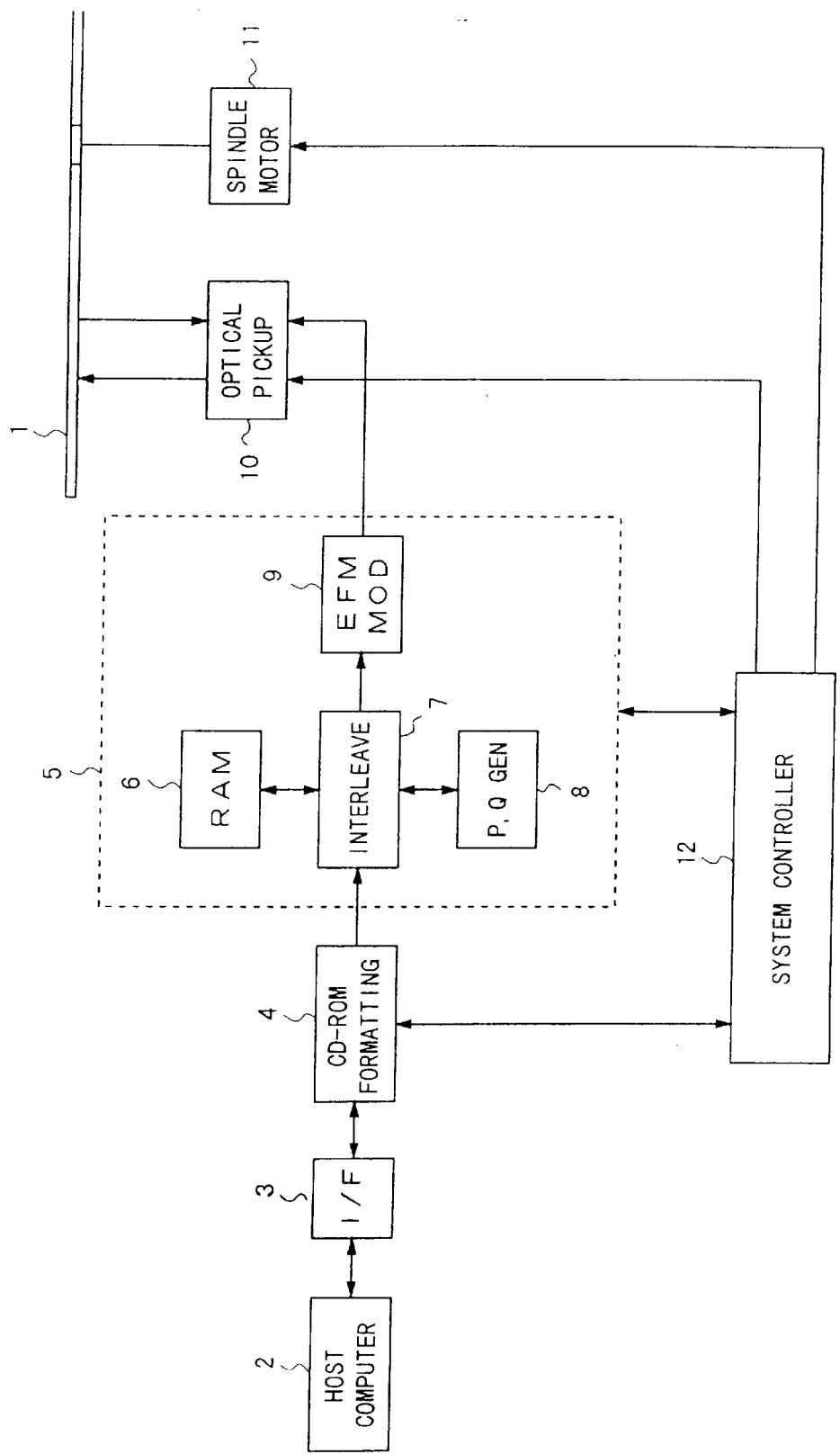
FIG. 1 is a block diagram showing an example of the structure of a recording side according to an embodiment of the present invention.

Next, an embodiment of the present invention will be described. FIG. 1 shows the structure of a recording side according to an embodiment of the present invention. In FIG. 1, a disc 1 can record data. More practically, the disc 1 is a master disc for use with a CD-ROM mastering system, a read-once type CD (CD-WO), an erasable CD (CD-E), or the like. As an example, in this embodiment, a CD-ROM mastering system will be considered.

Data to be recorded (referred to as record data) is supplied from a host computer 2 to a CD-ROM formatting circuit 4 through an interface 3. The formatting circuit 4 formats digital data as the record data corresponding to a CD-ROM format. As the CD-ROM format, mode 0, 1, 2, or the like is used.

The output data of the CD-ROM formatting circuit 4 is supplied to a CD format encoder 5 (denoted by a dot-lined box in the drawing). The encoder 5 is composed of a RAM 6, an interleaving circuit 7, a P parity, Q parity generating circuit 8, and an EFM modulating circuit 9 so as to generate record data in the same format as that of a CD-DA. As will be described later, the RAM 6, the interleaving circuit 7, and the parity generating circuit 8 perform a CIRC encoding process. The interleaving process is performed by controlling a write address and a read address of data to/from the RAM 6. The record data is supplied from the EFM modulating circuit 9 to an optical pickup 10 through a drive circuit (not shown). The optical pickup 10 records data on the disc 1 that is rotated by a spindle motor 11 at CLV (Constant Linear Velocity). In addition, a system controller 12 is disposed. The system controller 12 controls the formatting circuit 4, the CD format encoder 5, the optical pickup 10, and the spindle motor 11.

Figure 2:
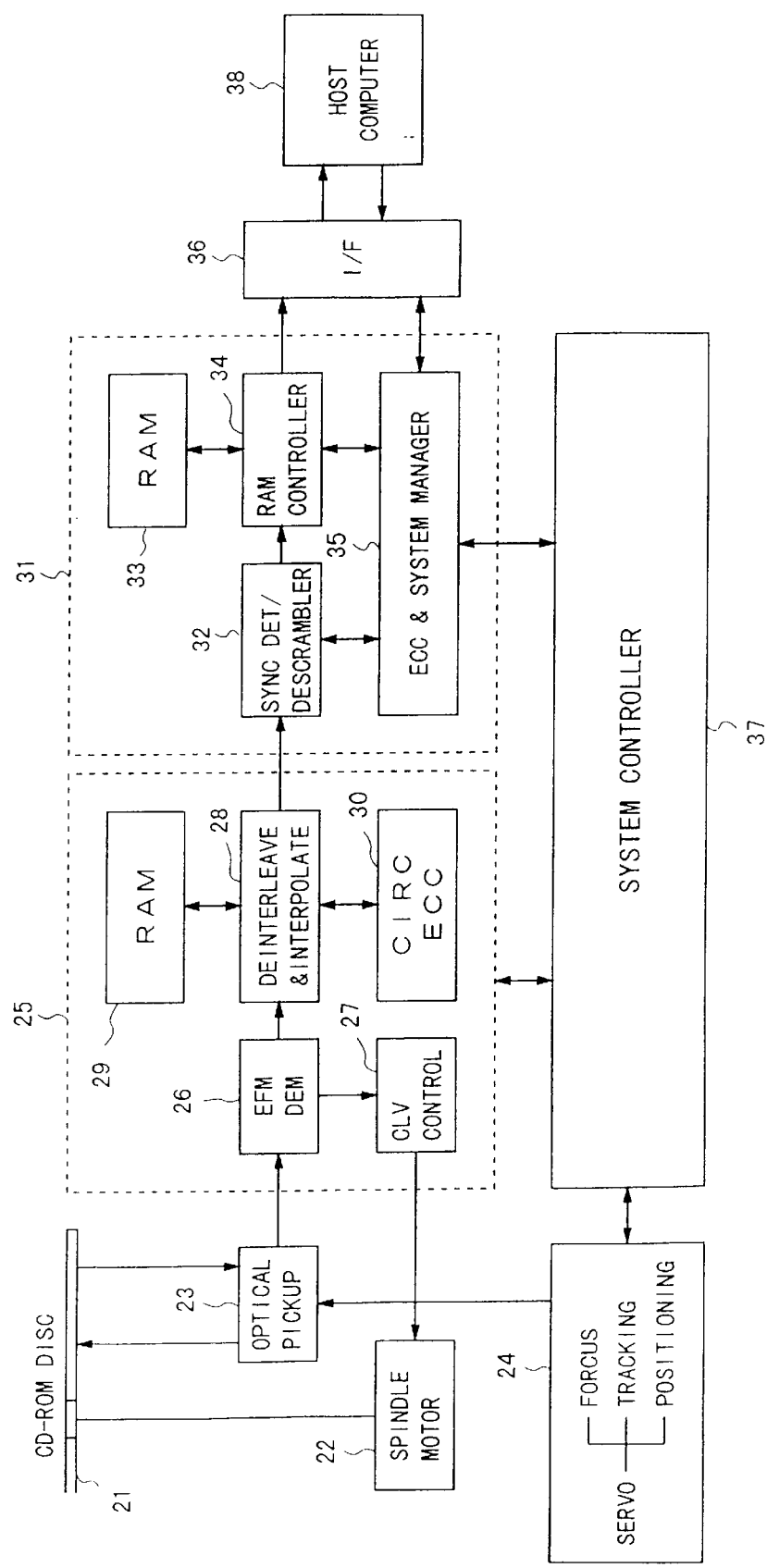
FIG. 2 is a block diagram showing an example of the structure of a reproducing side according to an embodiment of the present invention.

With the disc 1 as a master disc, a CD-ROM is produced by the same duplicating process as that of a CD. FIG. 2 shows a structure for reproducing this CD-ROM. In FIG. 2, reference numeral 21 is the CD-ROM. A spindle motor 22 rotates the CD-ROM 21 at CLV. An optical pickup 23 reads data of the CD-ROM 21. A servo circuit 24 is disposed for controlling the optical pickup 23. The servo circuit 24 includes a focus servo that controls the focus of the optical pickup, a tracking servo that controls the tracking thereof, and a positioning servo that controls the radius position of the disc.

Data that was reproduced (hereinafter referred to as reproduction data) is supplied from the optical pickup 23 to an EFM demodulating circuit 26 of a CD format decoder 25 (denoted by a dot-lined box in the drawing). A CLV controlling circuit 27 is disposed for controlling the EFM demodulating circuit 26. The CLV controlling circuit 27 controls a spindle motor 22 so that it rotates at CLV. The output data of the EFM demodulating circuit 26 is supplied to a deinterleaving and interpolating circuit 28. In association with the deinterleaving and interpolating circuit 28, a RAM 29 and an error correcting circuit 30 are disposed. As will be described later, the deinterleaving process is the reverse process of the interleaving process that is performed on the recording side. In other words, the deinterleaving process is a process for canceling a delay added to each symbol. By controlling a write address and a read address to/from the RAM 29, the deinterleaving process is accomplished. The interpolating process is a process for substituting an error symbol (that cannot be corrected) with the average of symbols that just follow and just precede in the time sequence.

Reproduction data that has been error corrected is supplied from the CD decoder 25 to a sync, header detecting circuit 32 of a CD-ROM deformatting circuit 31 (denoted by a dot-lined box in the drawing). The sync, header detecting circuit 32 separates a sync (sync signal) and a header from each sector of the record data on the CD-ROM. The circuit 32 performs a descrambling process that is the reverse process of the scrambling process performed on the recording side.

The header detecting circuit 32 is connected to a RAM controller 34 and an error correction and system manager 35. The RAM controller 34 controls a write operation and a read operation of the RAM 33. The error correction and system manager 35 detects an error for each sector, decodes an error correction code, and controls the operation of the deformatting circuit 31. User data is supplied from the RAM controller 34 to a host computer 38 through an interface 36. Likewise, an address, an error flag, and so forth are supplied from the error correction and system manager 35 to the host computer 38 through the interface 36. In addition, a system controller 37 is disposed. The system controller 37 controls the CD-ROM decoder 25 and the CD-ROM deformatting circuit on the reproducing side.

In addition to the recording/reproducing apparatus, the present invention can be applied for the case of which data is transmitted to a communication path. In this case, on the sending side, the output data of the EFM modulating circuit 9 is supplied to a modem. On the receiving side, the demodulated output data of the modem is supplied to the EFM demodulating circuit 26.

Figure 3A:
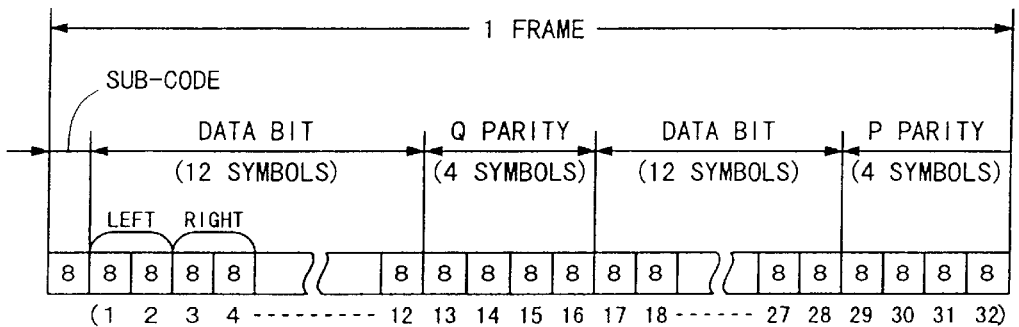
FIGS. 3A and 3B are schematic diagrams for explaining a CD format according to the present invention.

FIG. 3A shows data structure of one frame of a CD-DA of which data has not been FFM modulated. On the disc, data that has been EFM modulated and a frame sync has been added is recorded. As shown in FIG. 3A, one frame is composed of data bits (24 symbols) (of which audio data is sampled with 16 bits, left audio data and right audio data each being equivalent to six samples), a Q parity (four symbols), a P parity (four symbols), and a sub code (one symbol). One symbol is composed of the half of 16 bits, namely eight bits.

Each frame recorded on the disc is composed of:
Frame sync 24 channel bits
Data bit 14×24=336 channel bits
Sub code 14 channel bits
Parity 14×8=112 channel bits
Margin bits 3×34=102 channel bits Thus, the number of the total channel bits of one frame is 588 channel bits.

Figure 3B:
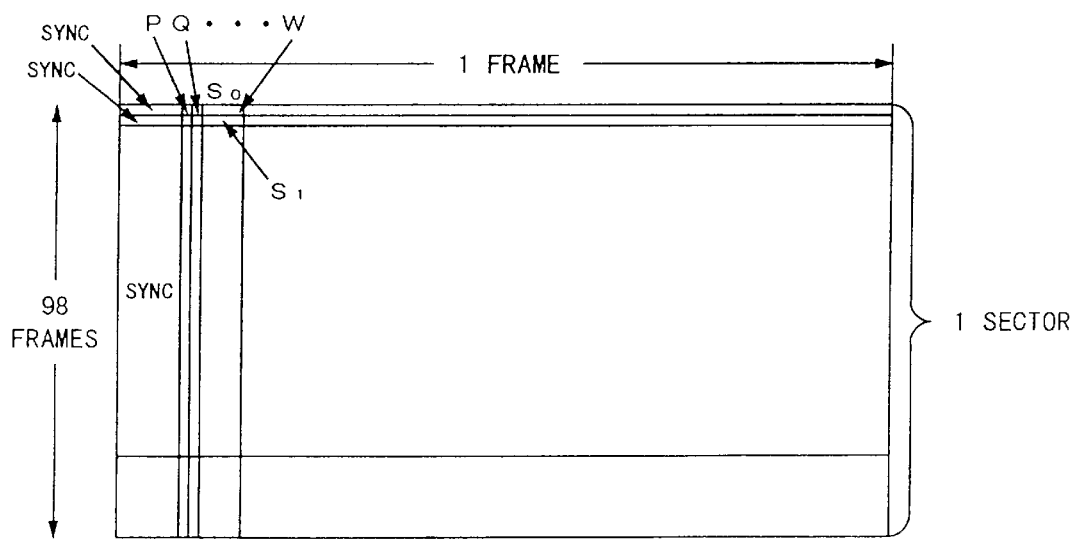

The sub code (one symbol) of each frame includes one bit of each of eight channels P to W. As shown in FIG. 3B, one sector is composed of data of one unit of sub codes (namely, 98 frames). The first two sub codes of the 98 frames are sub code frame syncs $S_0$ and $S_1$.

Figure 4:
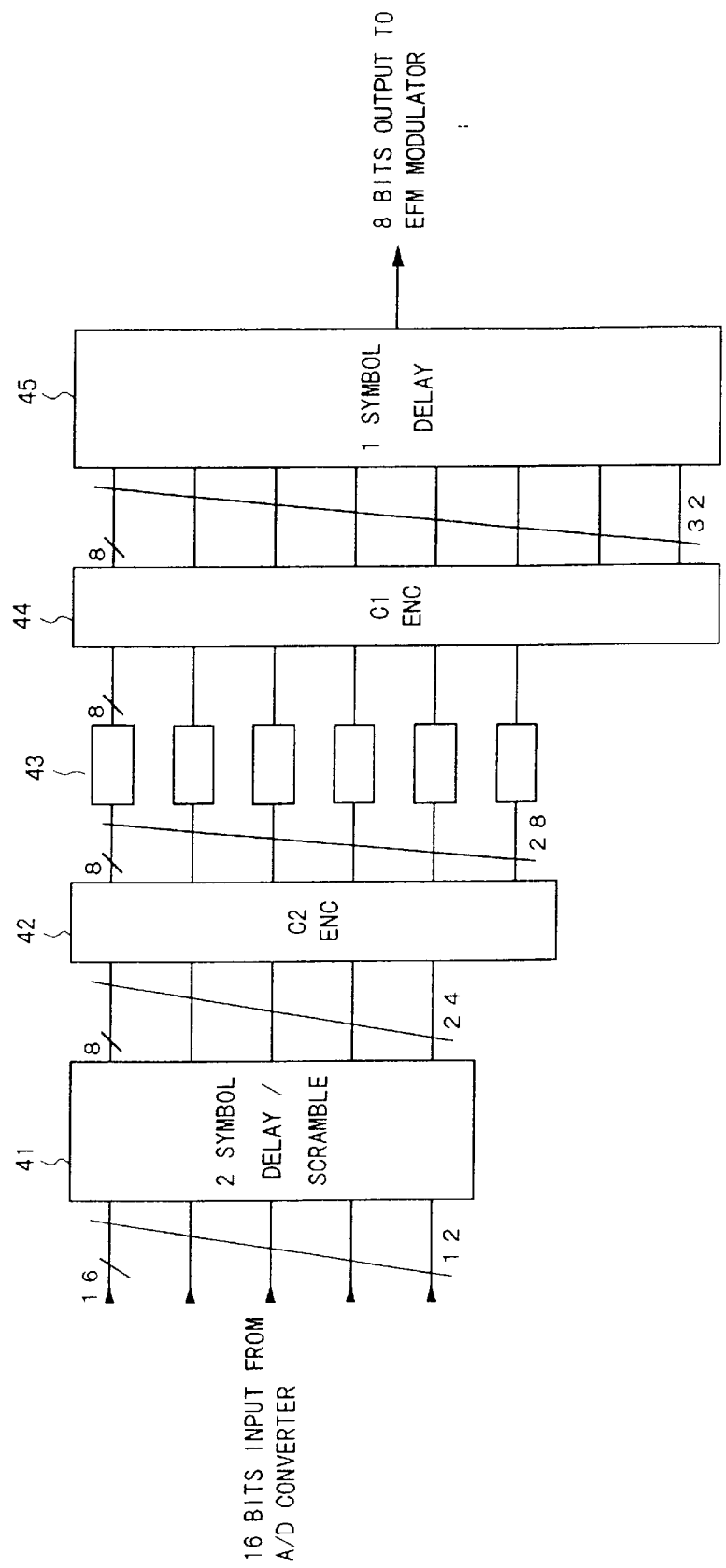
FIG. 4 is a block diagram showing an outline of a folding type dual code encoder according to the embodiment of the present invention.
Figure 5:
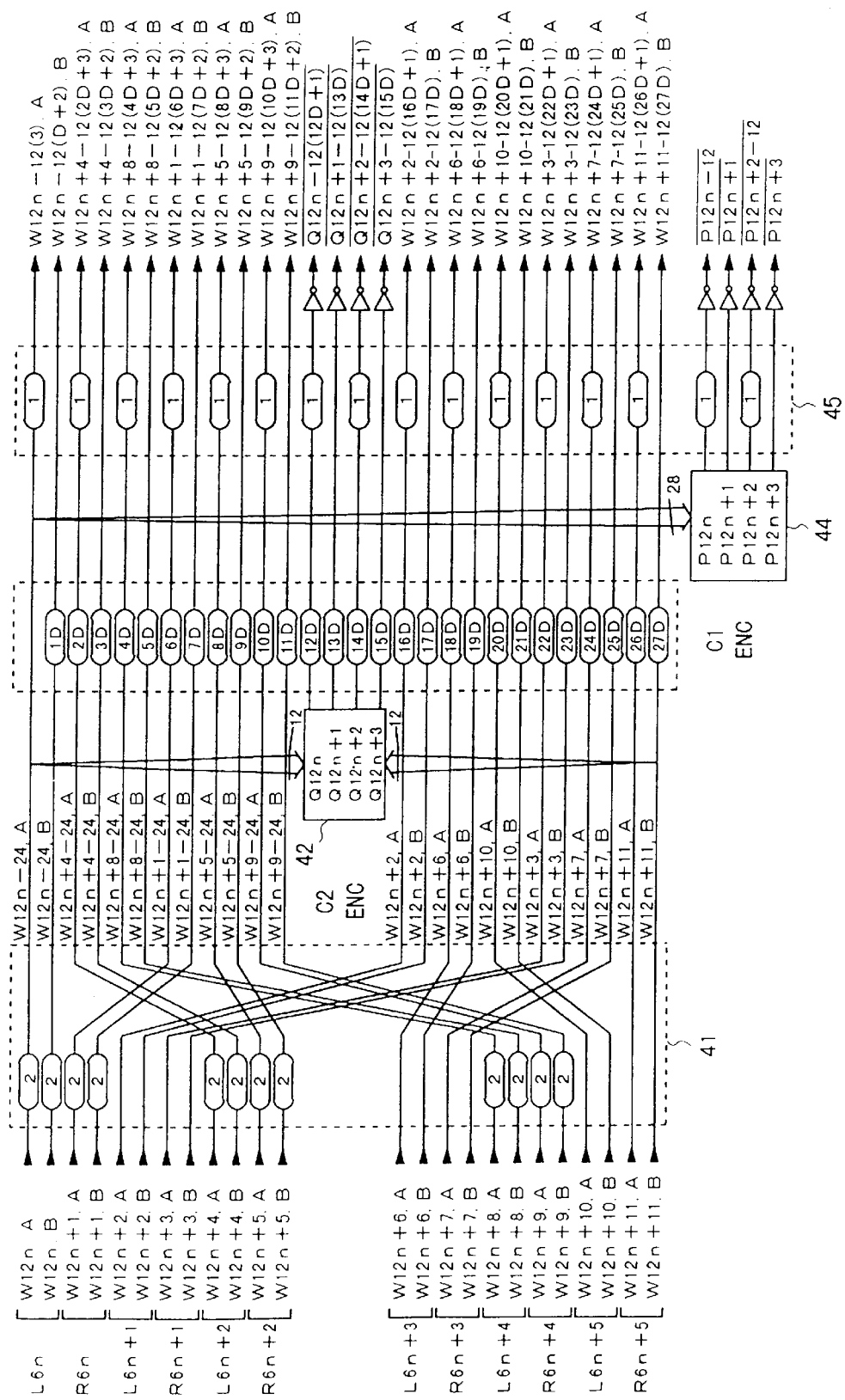
FIG. 5 is a block diagram showing a detail of the folding type dual code encoder according to the embodiment of the present invention.

FIG. 4 shows an outline of a CIRC encoding process performed by the CD format encoder 5. FIG. 5 shows a detail of the CIRC encoding process. FIGS. 4 and 5 are block diagrams that successively show steps of the encoding process. In the description for the CIRC encoding/decoding process, for simplicity, it is assumed that audio data is encoded. 24 symbols of which one word of an audio signal is divided into high order eight bits and low order eight bits ($W_{12n}$,A, $W_{12n}$,B, ..., $W_{12n-11}$,A and $W_{12n-11}$,B where high order eight bits are denoted by A and low order eight bits are denoted by B) are supplied to a two-symbol delaying circuit/scrambling circuit 41. The two-symbol delaying process is performed for even-word data $L_{6n}$, $R_{6n}$, $L_{6n+2}$, $R_{6n+2}$, ..., and so forth. Thus, even if an error takes place in all a sequence encoded by a C2 encoder 42, the error of the sequence can be interpolated. The scrambling process is performed for obtaining the maximum burst error interpolating length.

The output data of the two-symbol delaying circuit/scrambling circuit 41 is supplied to the C2 encoder 42. The C2 encoder 42 performs a (28, 24, 5) Reed-Solomon code encoding process on $GF(2^8)$ and generates four Q parity symbols $Q_{12n}$, $Q_{12n+1}$, $Q_{12+2}$, and $Q_{12n+3}$.

28 symbols as the output data of the C2 encoder 42 are supplied to an interleaving circuit 43. The interleaving circuit 43 adds delay amounts 0, D, 2D, ... and so forth (that vary corresponding to the relation of an arithmetic sequence and that D is a unit delay amount) to the individual symbols so as to convert a first array of the symbols to a second array. In the conventional CD-DA format, D is four frames. Thus, adjacent symbols are spaced by four frames. The interleaving circuit 43 disperses a burst error. The maximum delay amount is 27D (=108 frames). The total interleave length is 109 frames. As will be described later, the total interleave length is allocated to a multiple of 98 frames or a value slightly smaller than the multiple thereof.

The output data of the interleaving circuit 43 is supplied to a C1 encoder 44. The C1 encoder 44 performs a (32, 28, 5) Reed-Solomon code encoding process on $GF(2^8)$ and generates four P parity symbols $P_{12n}$, $P_{12n+1}$, $P_{12n+2}$, and $P_{12n+3}$. The minimum length of each of the C1 code and the C2 code is five. Thus, a two-symbol error can be corrected. In addition, (provided that the positions of error symbols are known), a four-symbol error can be erased for a correction.

32 symbols as the output data of the C1 encoder 44 are supplied to a one-symbol delaying circuit 45. The one-symbol delaying circuit 45 separates adjacent symbols from each other so as to prevent a two-symbol error due to an error of a symbol or an error at the boundary of adjacent symbols from taking place. The Q parity symbols are inverted. Thus, even if all data symbols and parity symbols become zero, an error can be detected.

Figure 6:
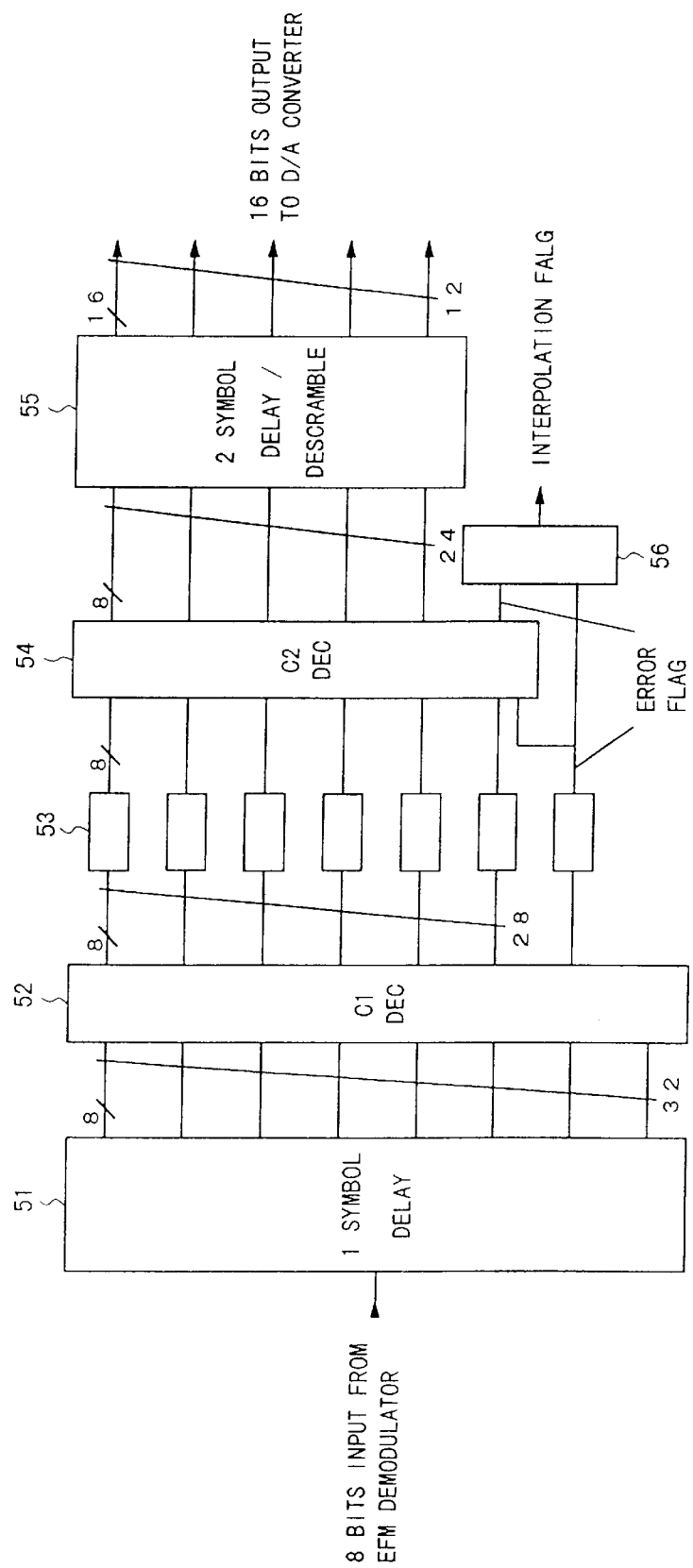
FIG. 6 is a block diagram showing an outline of a folding type dual code decoder according to the embodiment of the present invention.
Figure 7:
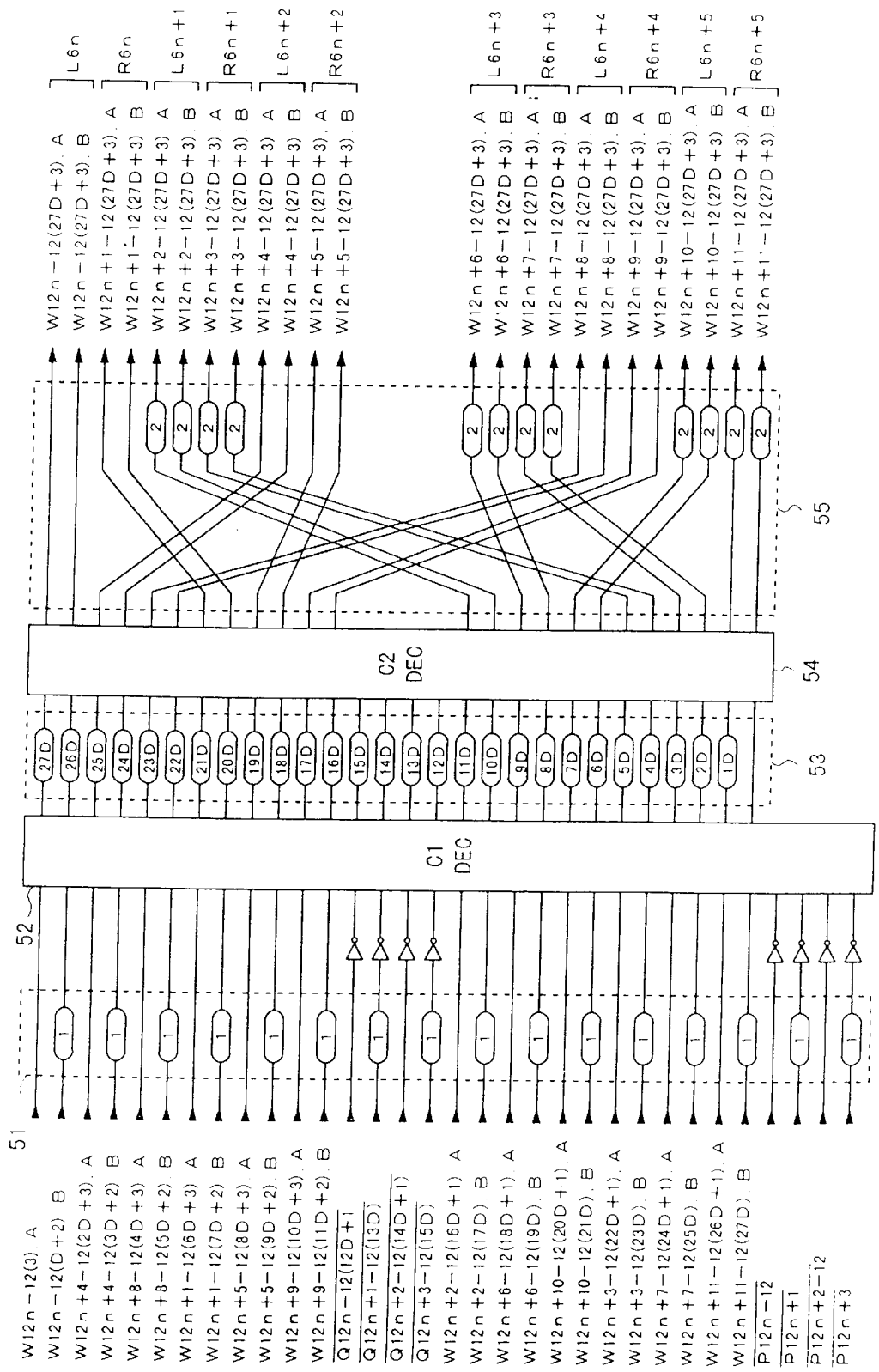
FIG. 7 is a block diagram showing a detail of the folding type dual code decoder according to the embodiment of the present invention.

FIG. 6 shows an outline of the CIRC decoding process performed by the CD format decoder 25. FIG. 7 shows a detail of the CIRC decoding process. FIGS. 6 and 7 are block diagrams that successively show steps of the decoding process. The decoding process is the reverse process of the encoding process. First, reproduction data is supplied from an EFM demodulating circuit 26 to a one-symbol delaying circuit 51. The one-symbol delaying circuit 51 cancels delays of symbols added in the one-symbol delaying circuit on the encoding side.

32 symbols as the output data of the one-symbol delaying circuit 51 are supplied to a C1 decoder 52. The output data of the C1 decoder 52 is supplied to a deinterleaving circuit 53. The deinterleaving circuit 53 adds delay amounts 27D, 26D, ..., D, and 0 (that vary corresponding to the relation of an arithmetic sequence) to the individual 28 symbols so as to cancel the delay amounts added by the interleaving circuit 43.

The output data of the deinterleaving circuit 53 is supplied to a C2 decoder 54. The C2 decoder 54 decodes the C2 code. 24 symbols as the output data of the C2 decoder 54 are supplied to a two-symbol delaying circuit/descrambling circuit 55. The circuit 55 outputs decoded data of 24 symbols. In FIG. 7, an error flag (not shown) generated by the C1 decoder 52 is deinterleaved as with data symbols and supplied to the C2 decoder 54. An interpolation flag generating circuit 56 generates an interpolation flag with the error flags supplied from the C1 decoder 52 and the C2 decoder 54. With this interpolation flag, data that represents an error is interpolated.

Figure 8:
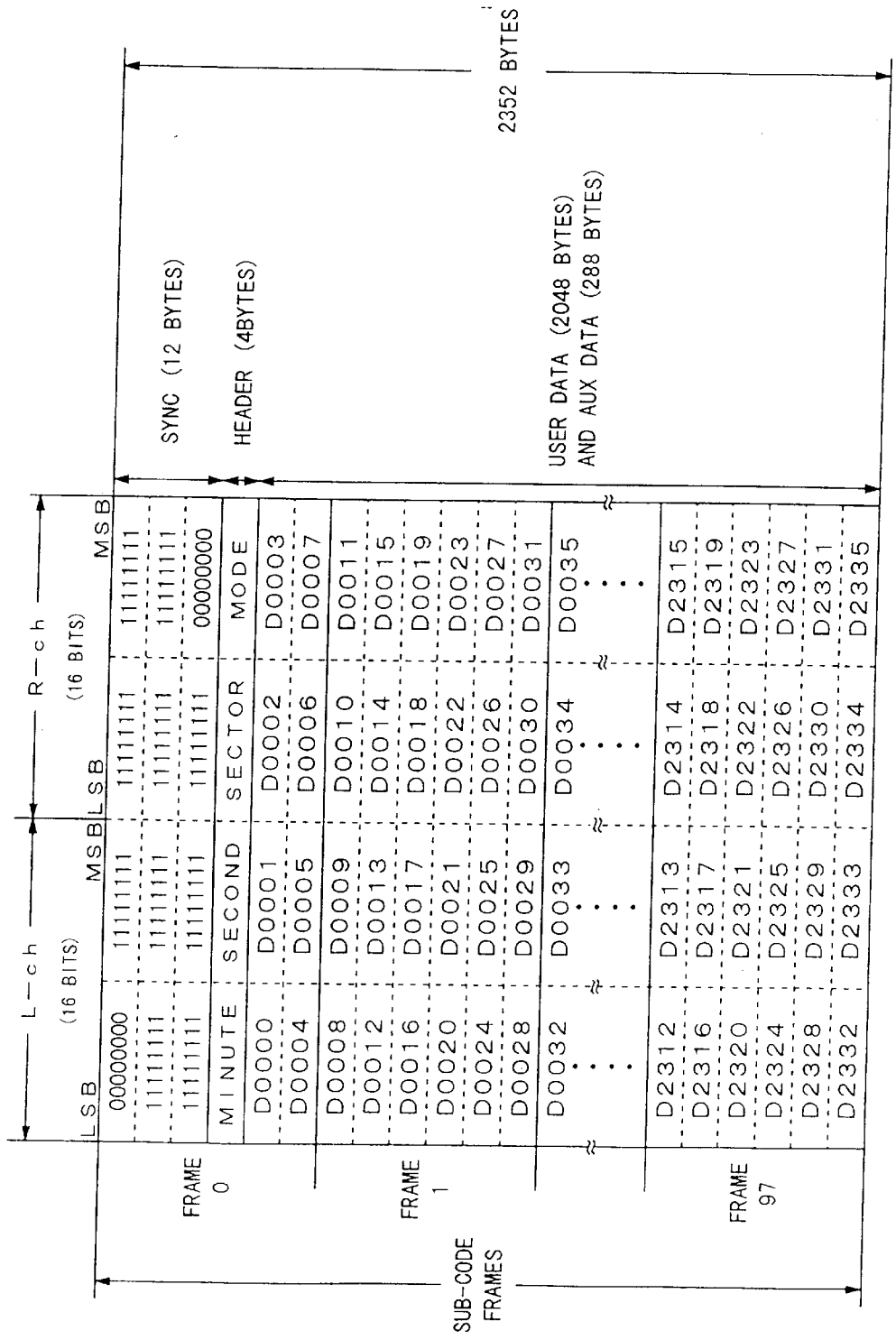
FIG. 8 is a schematic diagram showing a data structure of a CD-ROM according to the present invention.

In the CD-ROM format, instead of 12 words (24 symbols) of the above-described audio samples, digital data (computer data, still picture data, text data, and so forth) is used. In the CD-ROM format, one sector is composed of 98 frames (2,352 bytes) that are one unit of sub codes. FIG. 8 shows the data structure of one sector in for example the mode 1 of the CD-ROM format.

At the top of one sector, a synchronous signal of 12 bytes is placed. Thereafter, a header of four bytes is placed. The three bytes of the header represent a sector address (minute, second, and sector). The remaining bit of the header represents a mode. The sector address is a value that has a predetermined offset against an address contained in the Q channel of a sub code. The header is followed by user data of 2,048 bytes. Auxiliary data of 288 bytes is added to the user data of 2,048 bytes. The auxiliary data is composed of an error detection code (four bytes) for user data, a space (eight bytes), and a parity (276 bytes) for the error correction code.

Figure 9:
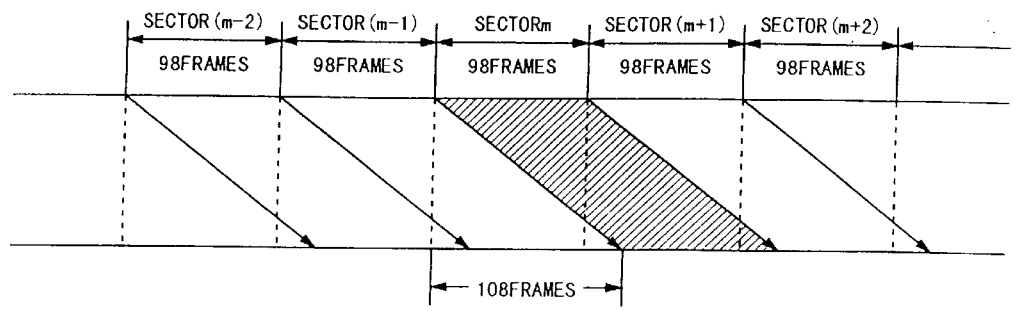
FIG. 9 is a schematic diagram for explaining an interleaving process of a conventional CD.

Next, the interleaving process as a feature of the present invention will be described. As shown in FIG. 9, the total interleave length of each of the conventional CD-DA format and the conventional CD-ROM format is 109 (=108+1) frames. Thus, in FIG. 9, data at the sector m is placed as hatched lines. When the data at the sector m denoted by the hatched lines is rewritten, all the C1 sequence at the sector (m+1) and part of the C1 sequence at the sector (m+2) are affected. In addition, all the C1 sequence at the sector (m−1) and part of the C1 sequence at the sector (m−2) are affected. Thus, when the data at the sector m is rewritten, the parities of the C1 sequences at the sectors (m+1), (m+2), (m−1), and (m−2) should be changed.

On the other hand, when data at the sector m is decoded and then reproduced, part of data at the sector (m−2), all data at the sector (m−1), all data at the sector (m+1), and part of data at the sector (m+2) are required along with all data at the sector m. Since the minimum unit of data being reproduced is a sector, data of five sector should be read. Thus, sectors that are not required should be wastefully read along with a required sector.

Figure 10:
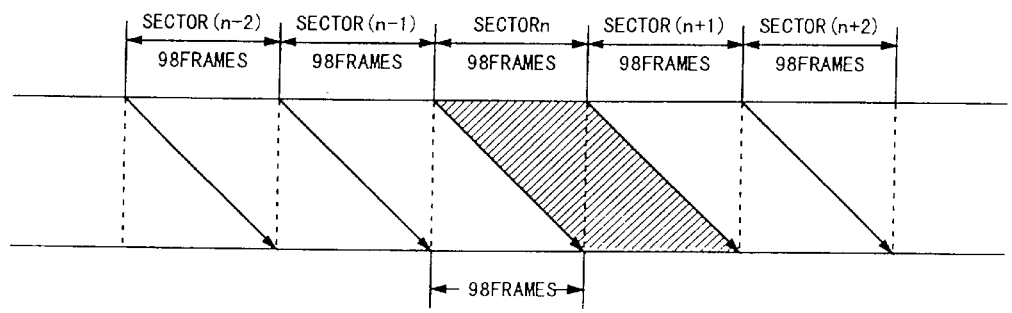
FIG. 10 is a schematic diagram for explaining an example of an interleaving process according to the present invention.

FIG. 10 shows an example of an interleaving process according to the present invention. In this example, the total interleave length is equal to 98 frames. This total interleave length cannot be accomplished by an interleaving circuit that adds delays that vary by the unit delay amount D to individual symbols. Instead, by adding delay amounts of frames (0, 4, 7, 11, 14, 18, 21, 25, 28, 32, 35, 39, 42, 46, 49, 53, 56, 60, 63, 67, 70, 74, 77, 81, 84, 88, 91, and 95) to individual symbols, the total interleave length becomes equal to 96 frames. In this example, three frames and four frames are alternately allocated as the difference of delay amounts between adjacent symbols.

In the interleaving process shown in FIG. 10, when one sector n is rewritten, after the sector n is read until it is decoded, sectors that are affected are only the sectors (n−1), n, and (n+1). Thus, the number of sectors to be accessed can be reduced and thereby data can be accessed at high speed.

Figure 11:
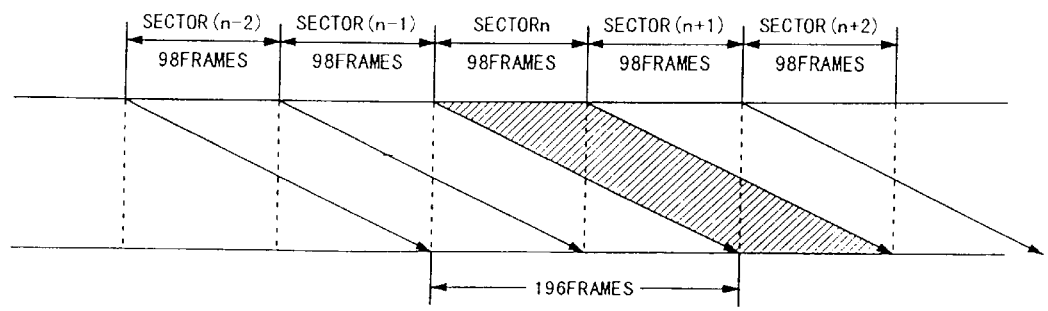
FIG. 11 is a schematic diagram for explaining another example of the interleaving process according to the present invention.

FIG. 11 shows another example of the interleaving process according to the present invention. In the example shown in FIG. 11, the unit delay amount D is allocated to seven. In the interleaving circuit 43 shown in FIG. 5, the minimum delay amount is 0. The maximum delay amount is (27×7=189 frames). The total delay amount is 190 frames. The total interleave length is slightly smaller than twice the unit of sub codes (98 frames).

In the interleaving process shown in FIG. 11, when one sector n is rewritten, the C1 parities of the C1 code sequences at the sectors (n−2), (n−1), (n+1), and (n+2) should be changed along with that at the sector n. Likewise, when the data at the sector n is decoded, the sectors (n−2), (n−1), n, (n+1), and (n+2) are required. That is the same as numbers of the sector required for the interleaving process of the conventional CD-DA and CD-ROM as shown in FIG. 9. However, the total interleave length is as large as 190 frames. Thus, the protection against a burst error can be enhanced comparing with the conventional method.

In addition, according to the present invention, an interleaving process can be performed with D=14 or D=28. In this case, the total interleave lengths of these cases are (27×14+1=379<98×4) and (27×28+1=757<98×8), respectively. In each case, the total interleave length becomes slightly smaller than a multiple of the unit of sub codes.

As described above, when the interleaving process of which the total interleave length is nearly a multiple of 98 frames where the multiple is larger than 2 is performed, the correction performance against a burst error can be improved. In addition, with a modulo (a multiple of 98) against the delay amount for the interleaving process and the deinterleaving process, the sector completion type encoding process can be easily accomplished. In the sector completion type interleaving process, diagonal lines that connect C2 code sequences fold back at multiples of 98 frames. When the maximum delay amount is smaller than the unit of sub codes (for example, 196 frames) by nearly the unit delay amount (for example, 7−1=6), no folding deterioration takes place. Thus, the sector completion type encoding process can be properly performed. In this case, as in 28×7=196= 98×2, 28×14=392=98×4, and 28×28=784=98×8, the relation of multiples of 98 frames can be accomplished.

In this embodiment, the total interleave length is allocated to a value slightly smaller than a multiple of 98 frames. However, part of the delay amounts may be increased so that the total interleave length becomes a multiple of 98 frames. In addition, according to the present invention, data of which the folding type dual code encoding process including the interleaving process with the total interleave length of 109 frames has been performed as in the conventional CD-DA format, CD-ROM format, and so forth or data of which the folding type dual code encoding process including the interleaving process with the total interleave length according to the present invention has been performed may be selected corresponding to the type of data or the like. Moreover, although the folding type dual code encoding process including the interleaving process with the total interleave length according to the present invention is performed, data may be recorded corresponding to the total interleave length being selected.

The total interleave length can be selected corresponding to the record density of the record medium, the transmission rate of the transmission path, the type of the record data, and so forth. When the record density is high, since the length of a burst error caused by the same defect on the record medium is long, the total interleave length is preferably long. On the other hand, when a large amount of data is sequentially accessed as in audio data and picture data, the conventional interleaving process can be used without a problem.

Next, another embodiment of the present invention will be described in detail. In the present invention, data of which two types of interleaving processes have been performed is present on the same record medium or on the same transmission path. For example, with a unit of an area, a track, or a sector, data of which the two types of interleaving processes have been performed is present on the same disc.

Figure 12:
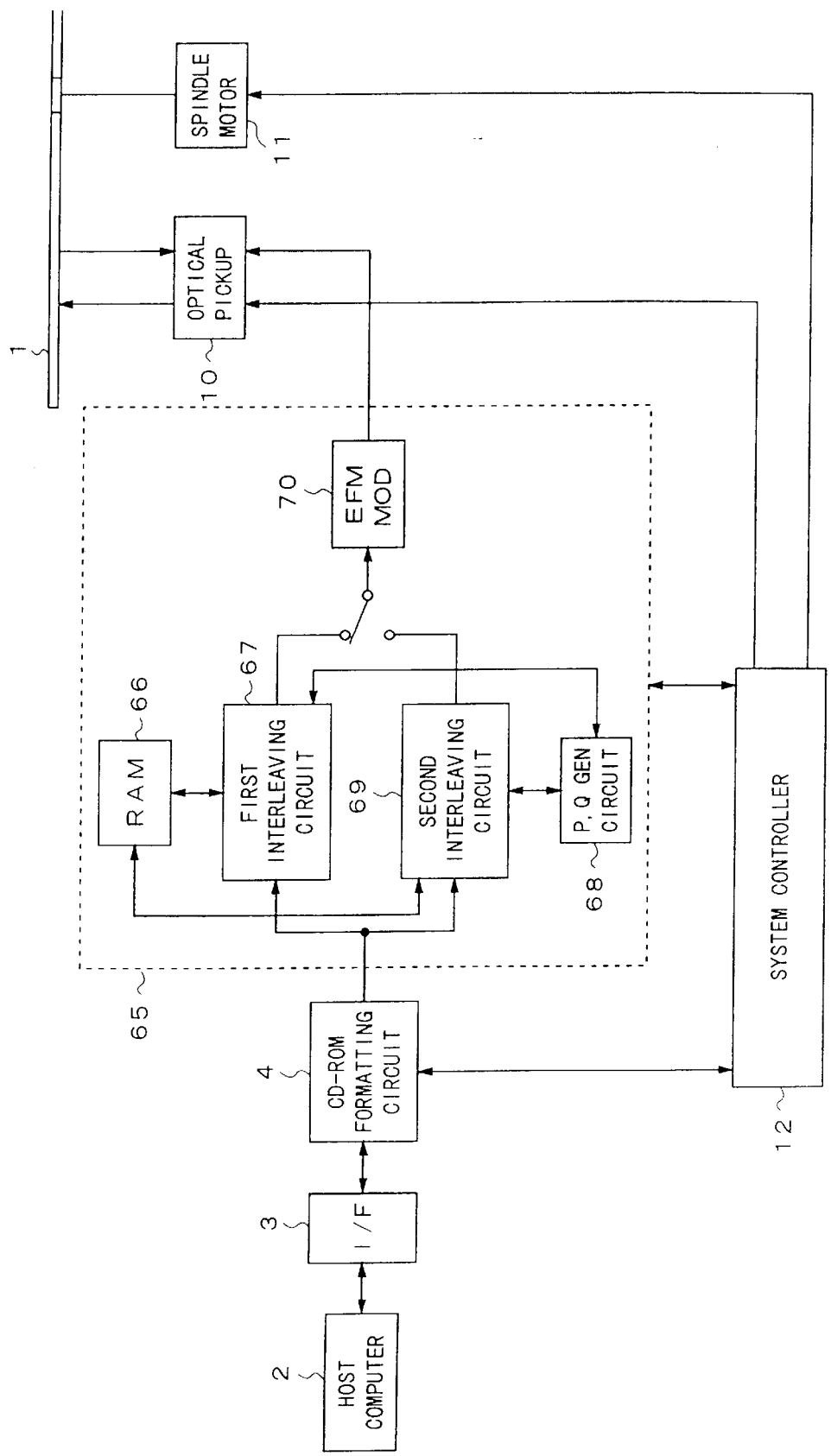
FIG. 12 is a block diagram showing an example of structures of a recording side according to another embodiment of the present invention.

FIG. 12 is a block diagram showing the structure of the recording side of another embodiment of the present invention. In FIG. 12, for simplicity, similar portions to those in FIG. 1 are denoted by similar reference numerals and their description is omitted.

An encoder 65 is composed of a RAM 66, a first interleaving circuit 67, a second interleaving circuit 69, a switching circuit 64, a P/Q parity generating circuit 68, and an EFM modulating circuit 70. The encoder 65 generates record data in the same format as the CD-DA.

The RAM 66, the first interleaving circuit 67, and the parity generating circuit 68 perform the above-described CIRC encoding process. The interleaving process is performed with a first interleave length by controlling a write address and a read address of the RAM 66.

Likewise, the RAM 66, the second interleaving circuit 67, and the parity generating circuit 68 perform the CIRC encoding process. The interleaving process is performed with a second interleave length by controlling a write address and a read address of the RAM 66.

The output data of the first interleaving circuit 67 or the output data of the second interleaving circuit 69 is selected by the switching circuit 64.

An ID that represents one of the first interleave length and the second interleave length is supplied from the host computer 2 to the switching circuit 64 through the interface 3, the CD-ROM formatting circuit 4, and the system controller 12.

In this case, the ID for identifying the interleave length should be recorded on the tape along with data. More practically, the ID is recorded at the header of each sector of the data structure of the CD-ROM.

The selected output data is EFM modulated by the EFM modulating circuit 70 and supplied to the optical pickup 10.

Next, with reference to FIG. 13, the structure of the reproducing side of this embodiment will be described. For simplicity, in FIG. 12, similar portions to those in FIG. 2 are denoted by similar reference numerals and their description is omitted.

Figure 13:
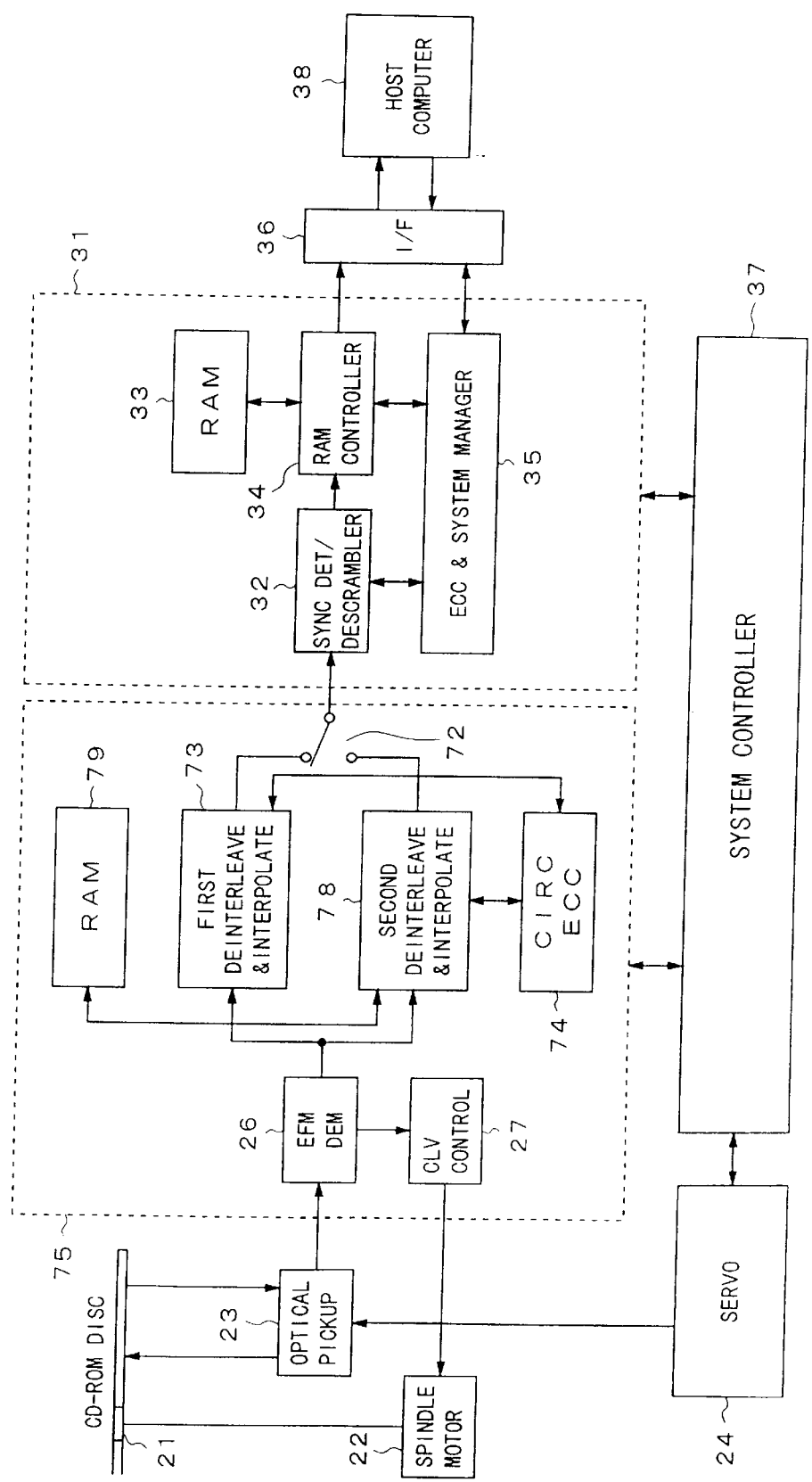
FIG. 13 is a block diagram showing an example of structures of a reproducing side according to another embodiment of the present invention.

Data reproduced from an optical pickup 23 is supplied to an EFM demodulating circuit 28 of a CD format decoder 75 denoted by dotted lines of FIG. 13 through a waveform shaping circuit (not shown).

The output data of the EFM demodulating circuit 26 is supplied to a first deinterleaving/interpolating circuit 73 and a second deinterleaving/interpolating circuit 78.

In association with the first deinterleaving/interpolating circuit 73 and the second deinterleaving/interpolating circuit 78, a RAM 79 and an error correcting circuit 74 are disposed.

As described above, the first deinterleaving process and the second deinterleaving process are reverse processes performed on the recording side. In other words, in the first deinterleaving process and the second deinterleaving process, delays applied to symbols are canceled. The deinterleaving processes are performed by controlling a write address and a read address of the RAM 79. Each of the interpolating processes corrects an un-correctable error of a symbol with the average of the preceding and following symbols on the time axis.

The output data of the first deinterleaving/interpolating circuit 73 and the output data of the second deinterleaving/interpolating circuit 78 are input to the switching circuit 72.

The switching circuit 72 selects the output data of the first deinterleaving/interpolating circuit 73 or the output data of the second deinterleaving/interpolating circuit 78 corresponding to the ID for identifying the interleave length. The ID is recorded at the header of each sector in the data structure of the CD-ROM. The ID is input to the switching circuit 72 through the EFM demodulating circuit 26 and the system controller 37.

The reproduced data selected by the switching circuit 72 is supplied to a sync/header detecting circuit 32 of a CD-ROM deformatting circuit 31 denoted by dotted lines of FIG. 13. The sync/header detecting circuit 32 performs the above-described process.

In the above-described embodiments, a structure of which data that has been interleaved with two types of interleave lengths is recorded/reproduced. However, the present invention can be applied for a structure of which data that has been interleaved with three or more types of interleave lengths is recorded/reproduced.

Moreover, the present invention can be applied for the case that a semiconductor memory is used as a record medium as well as the above-described disc-shaped record mediums.

According to the present invention, since the relation of the unit of sub codes and the total interleave length is defined, data that is accessed can be used without a loss. In addition, according to the present invention, the total interleave length can increased so as to improve the correction performance against a burst error. Moreover, according to the present invention, when the total interleave length is allocated to a multiple of the unit of sub codes, hardware resources of encoders and decoders in the conventional CD format and software resources thereof can be used. In addition, the total interleave length can be changed and the sector completion type encoding process can be easily accomplished. Moreover, data with different interleave lengths can be recorded on the same record medium and data can be easily reproduced therefrom.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A data reproducing apparatus for reproducing data from a record medium on which a predetermined number of encoded interleaved frames have been recorded, the encoded interleaved frames being generated by interleaving and encoding frames, one frame being composed of information data and a sub-code corresponding to the information data, additional information corresponding to a predetermined number of frames being composed of a predetermined number of sub-codes, the data recording apparatus comprising:

reproducing means for reproducing the encoded interleaved frames from the record medium and outputting the encoded interleaved frames;

decoding means for decoding the encoded interleaved frames so as to form interleaved frames; and deinterleaving means for deinterleaving the interleaved frames with an interleave length that is a multiple of the predetermined number and for forming frames.

2. A data reproducing method for reproducing data from a record medium on which a predetermined number of encoded interleaved frames have been recorded, the encoded interleaved frames being generated by interleaving and encoding frames, one frame being composed of information data and a sub-code corresponding to the information data, additional information corresponding to a predetermined number of frames being composed of a predetermined number of sub-codes, the data reproducing method comprising the steps of:

reproducing the encoded interleaved frames from the record medium and outputting the encoded interleaved frames;

decoding the encoded interleaved frames so as to form interleaved frames; and deinterleaving the interleaved frames with an interleave length that is a multiple of the predetermined number and for forming frames.

3. A data receiving method for receiving a predetermined number of encoded interleaved frames from a communication path at a time, the encoded interleaved frames being generated by interleaving and encoding frames, one frame being composed of information data and a sub-code corresponding to the information data, additional information corresponding to a predetermined number of frames being composed of a predetermined number of sub-codes, the data reproducing method comprising the steps of:

receiving the encoded interleaved frames from the communication path;

decoding the encoded interleaved frames so as to form interleaved frames; and deinterleaving the interleaved frames with an interleave length that is a multiple of the predetermined number and for forming frames.

4. A data reproducing apparatus for reproducing data from a record medium on which a predetermined number of encoded interleaved frames have been recorded, the encoded interleaved frames being generated by interleaving and encoding frames, one frame being composed of information data and a sub-code corresponding to the information data, additional information corresponding to a predetermined number of frames being composed of a predetermined number of sub-codes, the data recording apparatus comprising:

reproducing means for reproducing the encoded interleaved frames from the record medium and outputting the encoded interleaved frames;

decoding means for decoding the encoded interleaved frames so as to form interleaved frames;

first deinterleaving means for deinterleaving the interleaved frames with a first interleave length that is equal to or smaller than a multiple of the predetermined number and forming first type frames;

second deinterleaving means for deinterleaving the interleaved frames with a second interleave length that is larger than a multiple of the predetermined number and forming second type frames;

detecting means for determining whether the encoded interleaved frames have been interleaved with the first interleave length or the second interleave length and for outputting interleave length information; and selecting means for selecting the output of said first deinterleaving means or the output of said second deinterleaving means corresponding to the interleave length information.

* * * * *